Feb. 13, 1940. J. PANAGOPOULOS Re. 21,352

BEER COOLER DEVICE

Original Filed Jan. 26, 1937

INVENTOR
John Panagopoulos
BY
Dean Fairbank & Hirsch
ATTORNEYS

Reissued Feb. 13, 1940 Re. 21,352

UNITED STATES PATENT OFFICE 21,352

BEER COOLER DEVICE

John Panagopoulos, Youngstown, Ohio, assignor to Novadel-Agene Corporation, a corporation of Delaware Original No. 2,096,591, dated October 19, 1937, Serial No. 122,378, January 26, 1937. Application for reissue April 14, 1939, Serial No. 267,857

10 Claims. (Cl. 225—40)

The present invention relates to apparatus for cooling and dispensing brew and is more particularly concerned with an installation of the general type disclosed in the patent to Herman E. Schulse, No. 2,051,013, granted August 11, 1936, in which the brew within individual kegs of wood or metal is cooled and maintained cool by the circulation of cooling liquid, preferably cold water, through conduits or hollow structures that are built into or are part of the keg.

It is an object of the invention to provide an installation in which brew from a keg that affords facilities for cooling the contents thereof in situ may be dispensed without objectionable increase in the temperature thereof in its course of dispensing flow even though the faucet be remote from the keg, as for instance, on a higher floor of the building.

Another object is to provide an installation of the above type in which cooling liquid from the same source is utilized both for cooling the contents of the keg and for cooling the brew line beyond the keg which leads to the remote dispensing faucet.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

Figure 1:
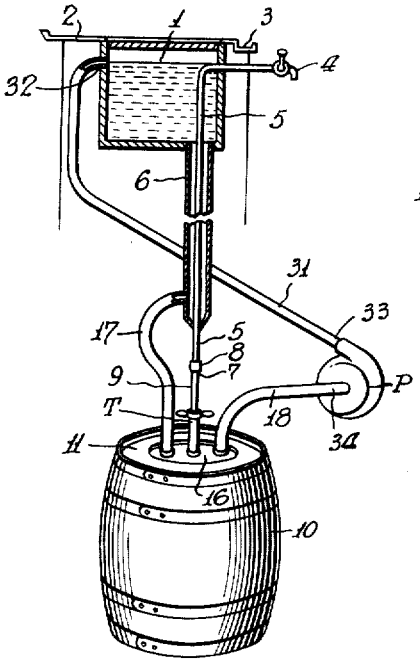
Figure 2:
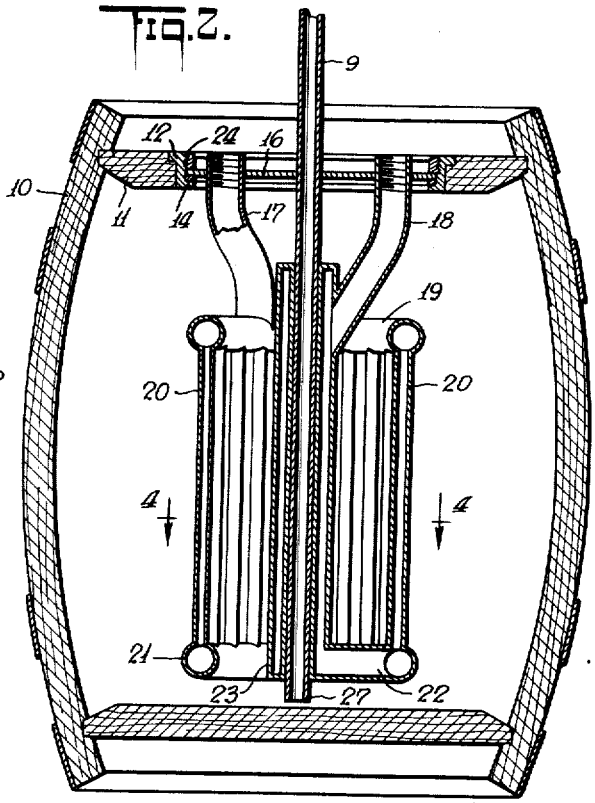
Figure 3:
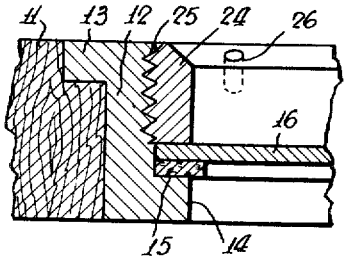
Figure 4:
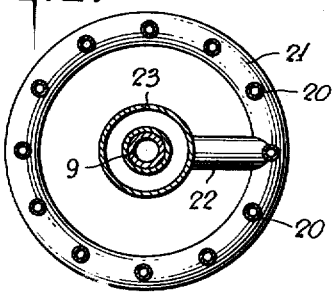
Figure 5:
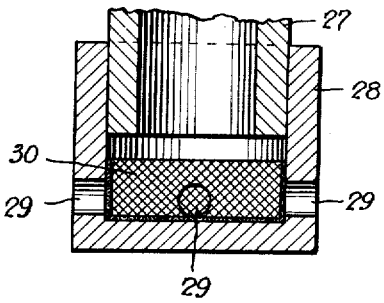

The invention is illustrated in the accompanying drawing, wherein:

Fig. 1 shows a vertical view of the device installed in a keg with the cooling tank underneath a bar in cross section, Fig. 2 is an enlarged view of the keg and parts therein in cross section, the conventional tap or stuffing box, shown in outline in Fig. 1, being omitted from the drawing, Fig. 3 is an enlarged detailed view of a unit partly in cross section, showing the means of installing and sealing a support for the beer cooling unit suspended within the keg, Fig. 4 is a cross section taken on line 4—4, Fig. 2, and Fig. 5 is an enlarged detailed view partly in cross section showing a screened beer intake at a central position at the bottom of the keg.

In Fig. 1 of the drawing there is shown a cooling tank 1 filled with water, and kept cold by conventional refrigerating means (not shown), suspended by way of example underneath a dispensing bar 2. Bar 2 has a trough 3 on its inner edge and directly beneath that a faucet 4 for the purpose of drawing beer or the like. The faucet is attached to a brew line in the form of a tube 5 which runs inwardly and downwardly through the cooling tank 1 and down through a downwardly extended cooling jacket 6. The tube 5 is connected at a point 7 by a coupling 8 to a beer outflow or draft tube 9 upwardly extended from keg 10 which is remote from the bar, desirably in the basement below the dispensing room. Draft tube 9 is connected to the keg by a tap or stuffing box shown in Fig. 1 at T, but since such tap is conventional, it is omitted from the showing of Fig. 2.

Referring to Figs. 2 and 3 the keg 10 may be provided with a head 11 having a central circular opening into which is fitted a ring member 12 provided with an upper outwardly extended flange 13 and a lower inwardly extended seat member 14. Upon this seat member 14 rests a circular gasket 15, upon which there is carried a circular plate support member 16. The cooling unit which is incorporated in the structure of the keg is a hollow part which may be supported by this circular plate support member 16 by having attached thereto a tubular cooling passageway 17 and a second tubular cooling passageway 18. It will also be seen by referring to Fig. 2 that the draft tube 9 is projected upwardly through a central opening of the circular plate support member 16. The tubular cooling passageway 17 connects to an upper tubular ring 19 which has a plurality of vertical tubes 20 attached thereto and having their lower ends attached to a tubular ring 21 near the lower head of the keg. The tubular ring 19 and the lower tubular ring 21 are spaced apart by the plurality of vertical tubes 20 and are parallel to each other. The lower tubular ring 21 is provided with the tubular channel 22 connecting to a vertical circular jacket 23 which snugly encloses the draft tube 9, and communicates at its upper end with passageway 18.

For assembly the circular plate support member 16 is placed upon the circular gasket 15 and a pressure ring 24 provided with exterior threads is screwed into corresponding threads 25 in the ring member 12. In order to turn the pressure ring 24 down firmly upon the circular plate support member 16 there is provided a pair of oppositely disposed circular recesses formed on the upper surface of the pressure ring 24, one of which is shown at a point 26. It is understood that any suitable tool may be used in connection with the oppositely disposed circular recesses in order to turn down or remove the pressure ring 24.

As shown in Fig. 5, a cap 28 rests upon the lower head of the keg, and has a plurality of horizontal inlets or ports 29 leading to a screen wall 30 to guard the lower end 27 of the draft tube 9 which is telescoped into said cap.

A pipe 31 extends from the cooling tank 1, preferably externally thereof and of jacket 6, and end 33 thereof is connected by a suitable pump P to the end 34 of tubular passageway 18. Thus the water or other cooling liquid is caused to be circulated by the pump P from tank 1 through jacket 6 and in series therefrom through the cooling structure in the keg and thence through passageway 18 and pipe 31 back to the tank. The cooling liquid may, if desired, be pumped in reverse sequence through the elements of the cycle set forth.

In operation, the cooling liquid in its sustained flow through the cooling unit in the keg maintains the quiescent keg contents at dispensing temperature substantially according to the mode of operation of the prior Schulse Patent No. 2,051,-013. The brew as it leaves the keg to enter the brew line 5 is already at substantially that temperature to which the cooling liquid is capable of bringing it and the cooling liquid in its flow through jacket 6 serves essentially, not to cool the brew further but to keep it from becoming warm while in said brew line, and until it flows out of the faucet 4. To this end the brew line extends substantially directly from the keg to the faucet without any localized region of larger volume such as a beer coil or an auxiliary small tank commonly required in systems in which the cooling or refrigeration of the brew occurs outside of the keg and in transit on its way to the faucet. The brew line as shown is preferably substantially uniform in volumetric content per unit of distance between its ends and the total length of brew line that extends within the cooling tank 1 is in the order only of that of the height of the tank.

Having thus described my invention, what I claim as new and desire to secure by Letters Patent is:

1. In a device of the class described, a keg, a circular suspension plate positioned in a head of said keg, a cooling unit suspended from said plate and comprising an upper and a lower tubular ring spaced apart by a plurality of vertical tubes, together with a centrally positioned jacket for accommodating a draft tube, a tube connecting the lower tubular ring and the jacket, means for securing and removing said suspension plate comprising a ring member positioned in the head of the keg, a circular gasket carried by the ring member and the circular suspension plate positioned on the upper surface of said gasket, a threaded pressure ring functioning with a threaded interior of said ring member, a cooling tank positioned above said keg, a brew line and a downwardly extending cooling jacket extending from the bottom of said cooling tank enclosing said brew line and connecting said cooling tank and cooling unit in order to provide circulating means between the cooling tank, the brew line and the suspended cooling unit.

2. A brew cooling and dispensing installation, comprising a keg incorporating in the structure thereof a hollow part in heat exchange relation with the keg contents, a dispensing faucet remote from said keg, an elongated brew line extending from said keg to said faucet, a conduit extending lengthwise of said brew line substantially the entire length of the latter and in heat exchange relation therewith, a source of cooling liquid and propulsion means for circulating cooling liquid from said source both through the hollow part incorporated in the keg and through the conduit along the brew line thereby to maintain the quiescent contents of the keg at substantially dispensing temperature and to prevent rise in the temperature of the keg cooled brew as it flows out of the faucet.

3. A brew cooling and dispensing installation, comprising a keg incorporating in the structure thereof a passageway in heat exchange relation with the keg contents, a faucet at a dispensing bar on the floor of the building above that where the keg is disposed, a brew line connecting the keg to the faucet and substantially uniform in volumetric contents per unit of distance between its ends, a jacket encircling said brew line, a source of cooling liquid and propulsion means for circulating liquid from said source through the passageway incorporated in said keg for maintaining at substantially dispensing temperature the quiescent brew therein and through said jacket about said brew line to prevent substantial rise in the temperature of the cooled brew until it flows out of the faucet.

4. A brew cooling and dispensing installation comprising a keg incorporating in the structure thereof a hollow part having an inlet and an outlet, a dispensing faucet remote from said keg, a brew line connected from said keg to said faucet, a source of cooling liquid, a conduit in heat exchange relation with said brew line and extending lengthwise thereof, said conduit communicating with said hollow part of the keg, and in series therewith, a return pipe from near the faucet end of said conduit and a pump for circulating cooling liquid from said source through the hollow part incorporated in said keg and serving to maintain the keg contents at dispensing temperature and, through the conduit along the brew line and through the return pipe.

5. A brew cooling and dispensing installation comprising a keg incorporating in the structure thereof a hollow part, a dispensing faucet at a bar on the floor of the building above that where the keg is disposed, a brew line communicating from said keg to said faucet, a water-tight jacket about said brew line spaced therefrom and affording a passageway thereabout, a pipe communicating from said hollow part of the keg to said jacket, a return pipe from near the upper end of said jacket, a source of cooling liquid in communication with said conduit, and a pump connecting said return conduit with respect to the hollow part of said keg structure, whereby in operation, cooling liquid from said source will be pumped in series and through the hollow part of said keg for cooling and maintaining cool the quiescent brew within said keg, and through said hollow jacket for preventing rise in temperature of the brew while in said brew line.

6. The combination recited in claim 5 in which the source of cooling liquid is a tank under the dispensing bar and in which the upper end of the brew line extends through said tank and the total length thereof within the tank is of the order of the height of the tank and in which the return pipe extends from said tank at the exterior of said jacket.

7. A brew cooling and dispensing installation, comprising a keg incorporating in the structure thereof a hollow part in heat exchange relation with the keg contents, which hollow part includes a metallic jacket longitudinally of the keg for snugly accommodating a draft tube, a removable draft tube therein, an elongated brew line connected to the outer end of said draft tube, a faucet remote from said keg and at the outer end of said brew line, a source of cooling liquid, a conduit extending lengthwise of said brew line, and in heat exchange relation therewith and propulsion means for circulating cooling liquid from said source both through the hollow part incorporated in the keg, including the jacket element thereof about the draft tube and also through the conduit along the brew line.

8. A brew cooling and dispensing installation comprising a keg incorporating in the structure thereof a hollow part in heat exchange relation with the keg contents, said hollow part including a metallic jacket extending longitudinally of said keg and adapted snugly to encircle a draft tube, said hollow part having an inlet and an outlet through the wall of said keg, a draft tube, a brew line connected to the outer end of said draft tube, a dispensing faucet remote from said keg connected to the outer end of said brew line and a conduit extending lengthwise of said brew line and in heat exchange relation therewith, said conduit being connected in series with the hollow part of said keg, a tank having cooling liquid therein and communicating with said conduit and propulsion means for circulating cooling liquid from said tank through said conduit and through the hollow part incorporated in the keg and through the jacket thereof.

9. A brew cooling and dispensing installation comprising a keg incorporating in the structure thereof a hollow part in heat exchange relation with the keg contents, which hollow part includes a jacket longitudinally of the keg for snugly encircling a draft tube, a draft tube in said jacket, an elongated brew line connected to the outer end of said draft tube, a dispensing bar on the floor of the building above that where the keg is disposed, a cold water tank associated with the bar, a jacket encircling the length of said beer line and communicating with said tank at one end and communicating at the other end with the jacket in said keg, a return pipe from said tank to the vicinity of said keg and a pump for circulating cold water from said tank through the jacket about the brew line, through the jacket about the draft tube, through the rest of the hollow structure incorporated in the keg and back to the tank.

10. A brew cooling and dispensing installation comprising a keg having a draft tube therein and incorporating in the structure thereof a hollow part in heat exchange relation with the keg contents, a source of cooling liquid, means for circulating liquid from said source through said hollow part continuously, thereby to bring the quiescent keg contents down to substantially dispensing temperature and to maintain said contents at such temperature, a dispensing faucet remote from said keg, an elongated brew line extending substantially directly from said draft tube to said faucet, a conduit extending lengthwise of said brew line substantially the entire length of the latter and in heat exchange relation therewith, said conduit being also connected to said source for the propulsion by said circulating means of cooling liquid therealong and the consequent prevention of heating of the cooled brew after it leaves the keg and while it is in the brew line, and thus substantially assuring delivery of the brew at substantially the dispensing temperature maintained in the keg from the time it leaves the keg until it passes out of the faucet.

JOHN PANAGOPOULOS.